United States Patent [19]

Maatela

[11] Patent Number: 4,616,951
[45] Date of Patent: Oct. 14, 1986

[54] COUPLING

[76] Inventor: Pentti I. Maatela, Kungsgatan 4, S-223 50 Lund, Sweden

[21] Appl. No.: 532,024

[22] PCT Filed: Dec. 21, 1982

[86] PCT No.: PCT/SE82/00435
§ 371 Date: Aug. 19, 1983
§ 102(e) Date: Aug. 19, 1983

[87] PCT Pub. No.: WO83/02297
PCT Pub. Date: Jul. 7, 1983

[30] Foreign Application Priority Data

Dec. 21, 1981 [SE] Sweden .............................. 8107657

[51] Int. Cl.⁴ .............................................. F16B 2/24
[52] U.S. Cl. .................................... 403/290; 403/292; 403/297; 403/381; 52/582; 24/498
[58] Field of Search ............... 403/297, 292, 381, 290; 52/582, 584, 586, 464, 468; 24/498, 513, 606

[56] References Cited

U.S. PATENT DOCUMENTS

| | | | |
|---|---|---|---|
| 2,339,865 | 1/1944 | Larmour | 52/464 |
| 2,579,011 | 12/1951 | Pieper | 403/381 X |
| 2,863,185 | 12/1958 | Riedi | 403/297 |
| 2,933,167 | 4/1960 | Keller | 52/582 X |

FOREIGN PATENT DOCUMENTS 2139750 12/1972 Fed. Rep. of Germany.
2403272 8/1975 Fed. Rep. of Germany.

Primary Examiner—Cornelius J. Husar
Assistant Examiner—Joseph A. Fischetti
Attorney, Agent, or Firm—Ladas & Parry

[57] ABSTRACT

A coupling for connecting two elements such as building elements. The coupling comprises two profile members (4, 5) attached to the elements (2, 3) to be connected, and a spring member (10). Each profile member has an L-shaped opening (6) adapted to receive one edge of the hat-shaped spring member, which comprises a screw (14) at its mid portion. When the screw is tightened, the edge portions of the spring member are securely locked in the L-shaped openings (7) and interlock the two elements. The coupling comprises preferably two spring members (FIG. 1).

4 Claims, 25 Drawing Figures

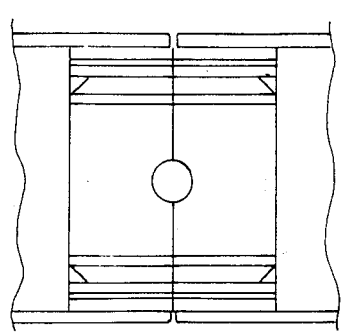
Fig 22
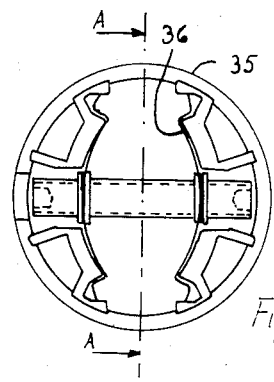
Fig 21
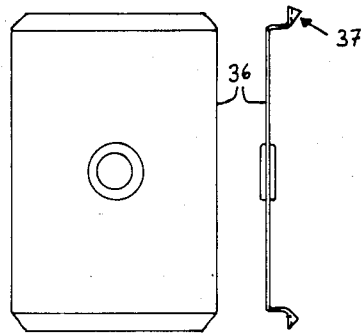
Fig 23
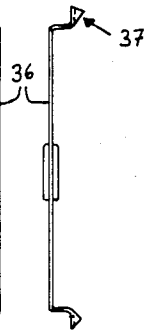
Fig 24
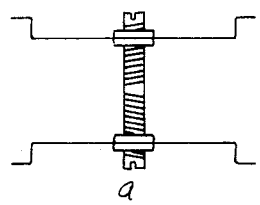
a
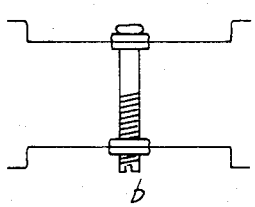
b
Fig 25
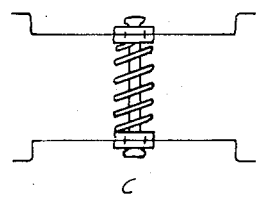
c
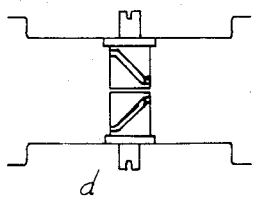
d

4,616,951

COUPLING

BACKGROUND OF THE INVENTION

The present invention relates to a coupling for interconnecting two elements such as building elements, which are placed adjacent each other side by side. Such a coupling is frequently used in numerous places, e.g. in a house between walls, in furniture, in beams.

In the German Offenlegungsschrift DE-OS-2 139 750 one approach to such a coupling is shown. This coupling maintains the walls in line with each other but cannot withstand substantial forces tending to separate the element.

In the German Offenlegungsschrift DE-OS-2 403 272 there is shown a coupling interconnecting two profile beams. The coupling is introduced inside the beams and exerts a pressure outwardly in order to generate a friction force locking the two beam elements together.

The object of the present invention is to provide an improved coupling between two colinear elements which coupling can withstand substantial separating forces.

SUMMARY OF THE INVENTION

Thus, the invention provides a coupling for interconnecting two elements along a connection line. The coupling comprises a spring member adapted to engage a profile member of each element to be interconnected. Each profile member is attached to or is an integral portion of the corresponding element and has a substantially L-shaped opening or recess, the first leg portion of which extending perpendicular to the connection line and the second leg portion of which extending along the connection line and having a small angle relative the connection line. The spring member is hat-shaped, i.e. each edge portion includes a first portion being perpendicular to the base surface of the spring member and a second portion being substantially parallel to but offset in relation to the base surface. The first and the second portions of the spring member are adapted to be received in the first leg portion of the L-shaped opening of the profile member. A screw or the like is adapted to bias the base surface of the spring member into a curved shape whereupon the rim of the second portion of the spring element being firmly pressed against a back surface of the first leg portion of the profile member.

Preferably, the angle between the first and the second leg portion of the profile member is about 70°–80° forming an apex therebetween.

The coupling can advantageously comprise two spring members symmetrically arranged on each sides of the connection center line.

Other objects and advantages of the present invention will become evident from the following description of several embodiments of the invention referring to the appended drawings, wherein:

BRIEF DESCRIPTION OF THE DRAWING

FIG. 21 is a cross-sectional view of a tubular coupling according to the invention;

FIG. 22 is a longitudinal sectional view taken along the line A—A of FIG. 21; and FIGS. 23 and 24 are a plan view and side view of the spring member of FIG. 21. FIGS. 25a–d shows different types of screws.

DESCRIPTION OF THE PREFERRED EMBODIMENT

Figure 1:
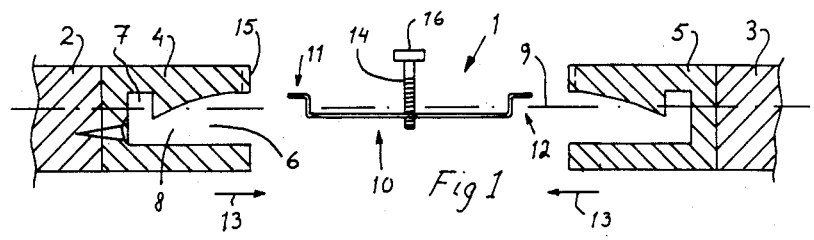
FIG. 1 is an exploded side cross-sectional view showing the principles of the invention.

In FIG. 1 the principles according to the invention are schematically shown. The coupling 1 is adapted to connect two elements 2 and 3 which can be building walls, profiles or other similar elements. To each opposite edge of the elements 2 and 3 a profile member 4 and 5 is attached e.g. by bolts, adhesive or as integral portions of the elements 2 and 3.

Each profile member 4 and 5 comprises an opening or recess 6 having roughly the shape of a L, the short leg portion 7 of which being essentially perpendicular to the connection line 9 between the two elements and the long leg portion 8 of which being inclined relative to said connection line 9 so that the angle between the short leg portion 7 and the long leg portion 8 is slightly below 90°, e.g. from 60°–90°, preferably from 70°–80°.

Figure 6:
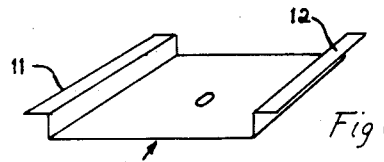
FIG. 6 is a perspective view of the spring member.

The coupling comprises a spring member 10 which is essentially hat shaped, i.e. each edge 11 and 12 of which being bent twice about 90°, as clearly is shown in FIG. 6. The spring member 10 comprises a screw 14 in the middle thereof.

Figure 2:
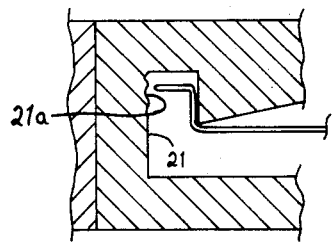
FIGS. 2 and 3 are enlarged cross-sectional views of the edge portion of the spring member of FIG. 1.

The coupling operates as follows. The two elements are brought into contact with each other according to the arrows 13 in FIG. 1 along the line 9 until the profile members abuts each other. The spring element 10 will during this movement be positioned with each edge portion 11, 12 in each leg portion 7 of the profile members as is shown in FIG. 2. The screw 14 will pass through a hole or a semicircular recess 15 in the abutting edges of the profile members and the head portion 16 of the screw 14 will be positioned outside the profile member. In this position, the elements 2 and 3 are provisionally interconnected by the spring member 10. In order to effect locking, the screw 14 is tightened whereby the spring element is bent to a partially circular form which further tightens the profile members 4 and 5 against each other (compare arrows 28 in FIG. 5).

Figure 3:
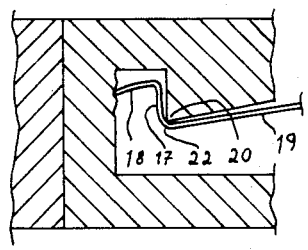

Simultaneously, each edge portion 11 and 12 is pivoted into engagement with the bottom of the opening 6 as appears from FIG. 3. The edge portion of the spring member comprises a first portion 17 which is bent about 90° relative to the spring member and a second portion 18 which is bent back about 90° so that the second portion is substantially parallel but offset in relation to the base surface 19 of the spring member. The two leg portions 7 and 8 of the recess 6 will form an apex 20, the angle of which being less than 90°, e.g. 75°. When tightening the screw 14, the second portion 18 of the spring element will be pivoted into abutment with the bottom surface 21 of the small leg portion 7 and will be firmly pressed against the bottom. The pivoting takes place around the apex 20 and will be circular. The pivoting is like a leverage having its fulcrum at the apex 20.

Moreover, the tightening of the screw 14 will entail that the edge 22 between surface 19 and the first portion 17 is pressed or biased against the apex 20 due to the spring action of the spring member.

From the description above it is evident that the coupling according to the invention provides an interconnection of the elements and also an interlocking which can withstand a substantial separating force. If such a separating force is applied to the elements, this force is transmitted to the spring member through the apexes 20. The force tends to straighten the spring member 10, which however is counteracted by the screw 14. The force also tends to bend up the edge 22, which however is counteracted by the second portion 18 which abuts against the bottom 21. This force also tends to move the edge 22 downwards in FIG. 3 which however is counteracted by both the spring action of the spring member and the contact of the second portion 18 with the bottom 21. Thus, the force must be so substantial that it breaks the spring member 10 at the edge 22 (or elsewhere) or breaks the apex 20.

Figure 4:
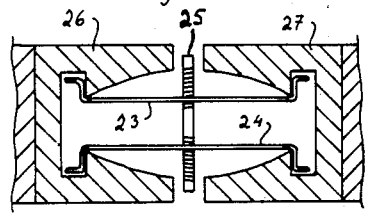
FIGS. 4 and 5 are cross-sectional side views of a second embodiment of the invention comprising two spring members.
Figure 5:
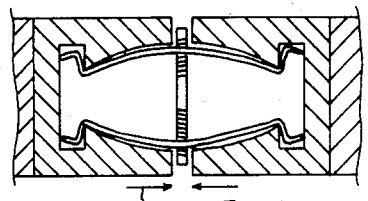

Preferably, the coupling according to the invention comprises two spring members 23, 24 which are symmetrically positioned on each side of the centrum line 25 as shown in FIGS. 4 and 5. The screw 26 can be a common screw having pitches in opposite directions on each half of the screw. When the screw 26 is tightened, the two profile members 26 and 27 are moved closer to each other as indicated by the arrows 28.

When operating the coupling according to FIG. 4 it is advantageous to first introduce the spring members 23 and 24 in the left profile member 26 of FIG. 4. Next, the second profile member 27 is moved into engagement with the protruding edges of spring member, which are snapped into the openings 7 and the second profile member 27 in order to provide the said interconnection, whereupon the coupling is locked.

It is also evident that different kind of screws can be used. In some applications it is sufficient to use a coil spring which biases the two spring members to the position shown in FIG. 5

Figures 7, 8, 9, 10:
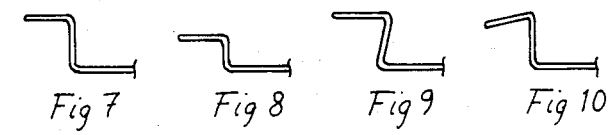
FIGS. 7–10 are partial cross-sectional views of the edge portion of the spring member.
Figure 12:
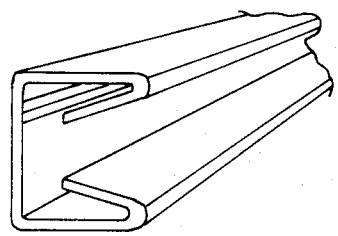
FIG. 12 is a partial perspective view of a second embodiment of the profile member.

In FIG. 6 the spring member 10 is shown in perspective. It is made from a substantially rectangular piece of sheet metal, which is bent twice at each edge. The edge of the spring member is shown in FIG. 7 and comprises two bends of each 90°. However, other bending angles can be advantageous at some applications and three other embodiments are shown in FIGS. 8–10. The Z-shape of FIG. 9 is favourable at some applications. In order to improve the grip of the outer edge of the second portion 18, the bottom 21 of the leg portion 7 can be provided with grooves 29 or serrations as shown in FIG. 2 and FIG. 12.

Figure 11:
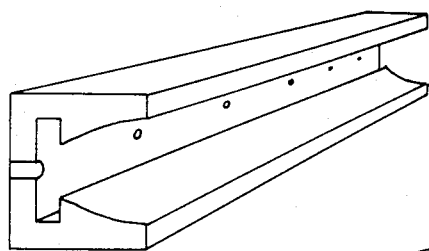
FIG. 11 is a perspective view of the profile member of FIG. 4.

The profile member can extend along the whole side of the element and can be of the shape shown in FIG. 11. Otherwise, the profile member can be bent from a sheet material as shown in FIG. 12 and can have any length required. The length of the spring member 10 can also be adapted to the application and can range from a couple of centimeters or even smaller or as much as several meters.

Figures 14, 15:
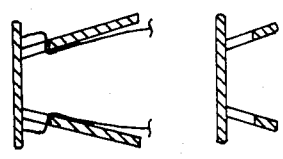
FIG. 14 is a cross-sectional view of the profile member of FIG. 13.
FIG. 15 is a cross-sectional view similar to FIG. 13 of a fourth embodiment of the profile memger.
Figure 13:
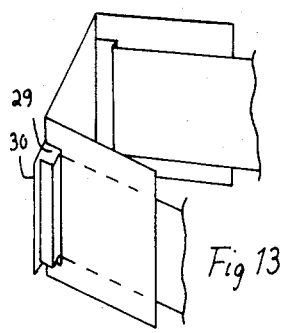
FIG. 13 is a third embodiment of the profile member.

In FIGS. 13 and 14 there is shown a profile member made from a sheet metal which is bent into a substantial U-shape. In the edge at the bends, there is cut out an opening 29, the material 30 of which is bent outwardly to be substantially coplanar with the bottom surface of the U-shaped profile member. The operation of this embodiment is identical to that described above. A further modification is shown in FIG. 15, wherein the legs have been cut to a shorter length.

Figure 16:
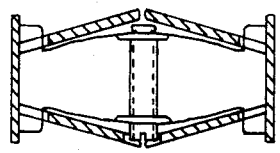
FIGS. 16–19 are cross-sectional views of a fifth, sixth, seventh and eighth embodiment of the profile member.

In FIG. 16 the embodiment of FIG. 13 is shown in the coupled position.

Figure 20:
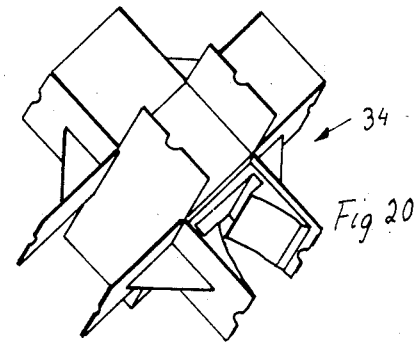
FIG. 20 is a perspective view of a multidirectional coupling according to the invention.
Figure 17:
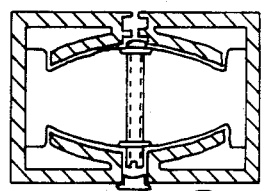
Figure 18:
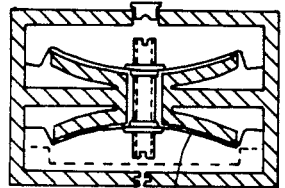
Figure 19:

In FIG. 17 there is shown a sixth embodiment of the coupling according to the invention which provides a sealed or watertight coupling. FIG. 18 shown a seventh embodiment wherein the spring members 31 have been bent in the opposite direction compared with FIG. 5. In FIG. 19 there is shown an eighth embodiment using merely one spring member 32 and being provided with a cover 33. FIG. 20 shows a multidirectional coupling member 34, which in each branch can be provided with profile members.

In FIGS. 21 and 22 there is shown the application of the coupling at a tubular profile 35. The spring member 36 of this embodiment is shown in greater details in FIGS. 23 and 24 and comprises four folding corners 37 which locate the spring member inside the profile member and prevent withdrawal of the two tubular profiles 35.

FIGS. 25a–d show different kinds of screws. FIGS. 25a and b show threaded screws. In FIG. 25c the spring members are interconnected by means of a coil spring and in FIG. 25d by means of a spring latch.

The coupling according to the invention can be used at many different applications, such as space-craft, bridges and other heavy constructions, buildings, furniture and also wrist-watches, the applications are too numerous to count; i.e. the coupling is a universal coupling. The invention is not limited to the embodiments shown, but is only limited by the appended patent claims.

I claim:

1. Coupling for interconnecting two elements along a connection line comprising a spring member adapted to engage a profile member of each element, characterized in that
    a. each profile member (4, 5) is attached to or is an integral portion of the corresponding element (2, 3);
    b. each profile member has at least one substantially L-shaped opening or recess (6), each of said recesses having a first leg portion (7) which extends perpendicular to the connection line (9) and a second leg portion coincident with the connecting line (9);
    c. the spring member (10) is hat-shaped, each edge portion of which includes a first portion (17) extending substantially perpendicular to the base surface (19) of the spring member and a second portion (18) extending substantially parallel to but offset in relation to the base surface;
    d. the spring member further comprising a biasing member (14) adjacent its middle portion adapted to bend the base surface of the spring member;
    e. the first and second portions (17, 18) of the edge of the spring member being bent relative to the base surface to be received in the first leg portion (7) of the L-shaped opening of the profile member, whereby the outer edge of the second portion (18) of the spring member is firmly pressed against a surface (21) of the first leg portion of the profile member at the tightening of the biasing member.

2. Coupling according to claim 1, characterized in that the angle between the first leg portion (7) and a second leg portion (8) of the L-shaped recess (6) is about 70°–80° forming an apex (20) therebetween.

3. Coupling according to claim 1, characterized in that the coupling comprises two spring elements (23, 24) symmetrically arranged on opposite sides of the connection center line (9).

4. Coupling according to claim 2, characterized in that the first leg portion (7) of the L-shaped recess includes grooves or serrations (29) at its bottom surface (21) adapted to engage the outer edge of the spring member.

* * * * *